United States Patent
Feng

(10) Patent No.: US 9,467,540 B2
(45) Date of Patent: Oct. 11, 2016

(54) MOBILE COMMUNICATION DEVICE

(71) Applicants: BOE TECHNOLOGY GROUP CO., LTD., Beijing (CN); HEFEI BOE DISPLAY LIGHT CO., LTD., Anhui (CN)

(72) Inventor: Qinggang Feng, Beijing (CN)

(73) Assignees: BOE TECHNOLOGY GROUP CO., LTD., Beijing (CN); HEFEI BOE DISPLAY LIGHT CO., LTD., Anhui (CN)

( * ) Notice: Subject to any disclaimer, the term of this patent is extended or adjusted under 35 U.S.C. 154(b) by 0 days.

(21) Appl. No.: 14/590,442

(22) Filed: Jan. 6, 2015

(65) Prior Publication Data

US 2015/0381781 A1 Dec. 31, 2015

(30) Foreign Application Priority Data

Jun. 25, 2014 (CN) ...................... 2014 2 0346138 U

(51) Int. Cl.
 *H04M 1/02* (2006.01)

(52) U.S. Cl.
 CPC ......... *H04M 1/0264* (2013.01); *H04M 1/0208* (2013.01); *H04M 2250/20* (2013.01)

(58) Field of Classification Search
 CPC .. H04M 1/0214; H04M 1/23; H04M 1/0225; H04M 1/0266; H04B 1/3833
 USPC ........ 455/575.1, 90.3, 128, 566, 158.4, 3.06
 See application file for complete search history.

(56) References Cited

U.S. PATENT DOCUMENTS

| | | | | |
|---|---|---|---|---|
| 3,776,732 A * | 12/1973 | Frost | ........................ | G03C 8/42 430/209 |
| 5,758,198 A * | 5/1998 | Watkins | ................. | G03B 17/02 396/411 |
| 6,073,034 A * | 6/2000 | Jacobsen | .............. | G02B 25/002 345/102 |
| 6,137,525 A * | 10/2000 | Lee | ...................... | H04M 1/0247 348/14.02 |
| 6,540,396 B1 * | 4/2003 | Barras | .................. | G04G 17/083 368/12 |
| 7,158,083 B2 * | 1/2007 | Satoh | ..................... | H01Q 1/084 343/702 |
| 7,467,000 B2 * | 12/2008 | Shiba | ................... | G06F 1/1681 455/550.1 |

(Continued)

*Primary Examiner* — Bobbak Safaipour
(74) *Attorney, Agent, or Firm* — Harness, Dickey & Pierce, P.L.C.

(57) ABSTRACT

The present disclosure relates to the field of display technology, and discloses a mobile communication device. The mobile communication device comprises a display screen, a back cover, and internal communication parts provided in a chamber defined by the display screen and the back cover. A rotating member is provided on an upper side of the back cover, and the rotating member is rotatable around the back cover, and a telephone receiver and a camera are arranged on the rotating member. In the mobile communication device according to the present disclosure, no telephone receiver and camera are required to be arranged on the front surface thereof, which is capable of saving a front frame and space for installing the telephone receiver and the camera on the front frame of the mobile communication device.

11 Claims, 3 Drawing Sheets

(56) References Cited

U.S. PATENT DOCUMENTS

| | | | |
|---|---|---|---|
| 2002/0077145 A1* | 6/2002 | Kamiya | H04M 1/0214 455/556.1 |
| 2002/0160724 A1* | 10/2002 | Arai | H04N 7/142 455/575.1 |
| 2003/0036365 A1* | 2/2003 | Kuroda | H04M 1/0214 455/575.1 |
| 2004/0209645 A1* | 10/2004 | Park | G06F 1/162 455/556.1 |
| 2005/0009581 A1* | 1/2005 | Im | H04M 1/0237 455/575.4 |
| 2005/0195322 A1* | 9/2005 | Park | H04N 5/2252 348/373 |
| 2005/0250561 A1* | 11/2005 | Lee | H04M 1/0247 455/575.3 |
| 2006/0240879 A1* | 10/2006 | Heikkinen | H04M 1/0237 455/575.1 |
| 2007/0081818 A1* | 4/2007 | Castaneda | H04M 1/0264 396/429 |
| 2007/0211328 A1* | 9/2007 | Lerenius | H04M 1/0283 359/265 |
| 2008/0031606 A1* | 2/2008 | Zax | G03B 29/00 396/56 |
| 2008/0039156 A1* | 2/2008 | Lee | H04M 1/0208 455/575.1 |
| 2009/0231662 A1* | 9/2009 | Sorensson | G02F 1/15 359/273 |
| 2010/0309442 A1* | 12/2010 | Sadhu | G06F 1/1616 353/79 |
| 2011/0003616 A1* | 1/2011 | Gorsica | H04M 1/0243 455/556.2 |
| 2011/0053664 A1* | 3/2011 | Shim | H04M 1/0222 455/575.3 |
| 2011/0228457 A1* | 9/2011 | Moon | G06F 1/1626 361/679.01 |
| 2013/0109371 A1* | 5/2013 | Brogan | G06F 1/1626 455/420 |

* cited by examiner

MOBILE COMMUNICATION DEVICE

CROSS-REFERENCE TO RELATED APPLICATION

This application claims priority to Chinese Utility model Application No. 201420346138.2 filed on Jun. 25, 2014, entitled "A MOBILE COMMUNICATION DEVICE" the disclosures of which are incorporated in their entirety by reference herein.

TECHNICAL FIELD

The present disclosure relates to the field of display technology, in particular to a mobile communication device.

BACKGROUND

With the development of smartphones, the functions that mobile phones are getting better and better. Accordingly, more and more functional parts are arranged on the phone.

In the existing technology, as shown in FIG. 1, which is a schematic view showing the structure of a front side of a mobile phone in the existing technology. The front side of the mobile phone is provided with a secondary camera 01, a display screen 02, a front frame 03, a functional key 04, a telephone receiver 05, etc. As shown in FIG. 2, which is a schematic view showing the structure of a back side of the mobile phone in the existing technology. The back side of the mobile phone is generally provided with a primary camera 06, a back cover 07, an LED flash light 08, etc. A volume key, a power key, a microphone, etc. are arranged on a side of the mobile phone.

As can be seen, in the existing technology, the secondary camera and the telephone receiver are provided on the front side of the mobile phone for easy using such that it is required to arrange a front frame on the front side of the mobile phone to install the camera and the telephone receiver. The arrangement of the front frame makes an outer frame of the mobile phone wider, failing to obtain the mobile phone with a structure of no frame and narrow frame.

SUMMARY

The present disclosure provides a mobile communication device, obtaining the mobile communication device with a structure of no frame or narrow frame, and easy to use.

In order to achieve the above object, the present disclosure provides the following technical solutions.

The present disclosure provides a mobile communication device. The mobile communication device comprises a display screen, a back cover, and internal communication parts provided in a chamber defined by the display screen and the back cover. A rotating member is provided on an upper side of the back cover, and the rotating member is rotatable around the back cover. A telephone receiver and a camera are arranged on the rotating member.

In some preferable embodiments, telephone receiver and the camera are electrically connected with the internal communication parts.

In some preferable embodiments, the rotating member comprises a rotating plate provided with the telephone receiver and the camera, and a motor for driving the rotating plate to rotate. The motor is provided in the chamber defined by the display screen and the back cover, and the rotating plate is pivoted around the upper edge of the back cover via a pivotal shaft.

In some preferable embodiments, a button controlling the operation of the motor is arranged on the back cover.

In some preferable embodiments, a containing groove is provided on a surface of the back cover, and the rotating plate is embeddable into the containing groove.

In some preferable embodiments, the rotating plate is pivoted to the back cover via the pivotal shaft. As one choice, an installation shaft is provided on each opposite side walls of the containing groove, and axial lines of two installation shafts are aligned with each other. Installation holes are provided on the rotating plate corresponding to the installation shafts, and axial lines of the installation holes are aligned with the axial lines of the installation shafts. Each pair of the installation shafts are installed in the installation holes in a manner such that the installation shafts are rotatably inserted to the installation holes. As another choice, an installation hole is provided on both opposite side walls of the containing groove, and axial lines of two installation holes are aligned with each other. Installation shafts are provided on the rotating plate corresponding to the installation holes, and axial lines of the installation shafts are aligned with the axial lines of the installation holes. Each pair of the installation shafts are installed in the installation holes in a manner such that the installation shafts are rotatably inserted to the installation holes.

In some preferable embodiments, a self-locking mechanism is provided between at least one pair of the installation shafts and the installation holes.

In some preferable embodiments, the self-locking mechanism comprises one or more convex(es) provided on a side wall of the installation shaft, and one or more concave(s) provided on a side wall of the installation hole, and the convex(es) is engagable with the concave(s); or one or more concave(s) provided on a side wall of the installation shaft, and one or more convex(es) provided on a side wall of the installation hole, and the convex(es) is engagable with the concave(s).

In some preferable embodiments, the angle of the rotating member rotating around the upper side of the back cover is in the range of 0-210 degree relative to the back cover.

In some preferable embodiments, the mobile communication device further comprises other functional members electrically connected with the internal communication parts, and the other functional members are arranged on the back cover or on the rotating member.

In some preferable embodiments, the other functional member is arranged on a side of the back cover.

In some preferable embodiments, the other functional member is selected from at least one of a group consisting of a volume key, an earphone jack, a data line terminal, a microphone and an LED flash light In the mobile communication device according to the present disclosure, no telephone receiver and camera are required to be provided on the front side, which is capable of saving a front frame and space for installing the telephone receiver and the camera on the front frame of the mobile communication device. That is to say, the mobile communication device with a structure of no frame or narrow frame may be provided, and the mobile communication device is easy to use.

| Reference number | |
|---|---|
| 01 secondary camera, | 02 display screen |
| 03 front frame, | 04 functional key |
| 05 telephone receiver, | 06 primary camera |
| 07 back cover, | 08 LED flash light |
| 1 display screen, | 2 back cover |
| 21 containing groove, | 3 rotating member |
| 31 rotating plate, | 4 telephone receiver |
| 5 camera | |

DETAILED DESCRIPTION

The technical solution in the embodiment of the present disclosure will be described below clearly and fully in conjunction with the drawings therein. Obviously, the embodiment described is merely a part of embodiments other than all the embodiments. All embodiments obtained by an ordinary person skilled in the art without involving inventive work based on the embodiments of the present disclosure fall into the protection scope of the present disclosure.

Figure 1:
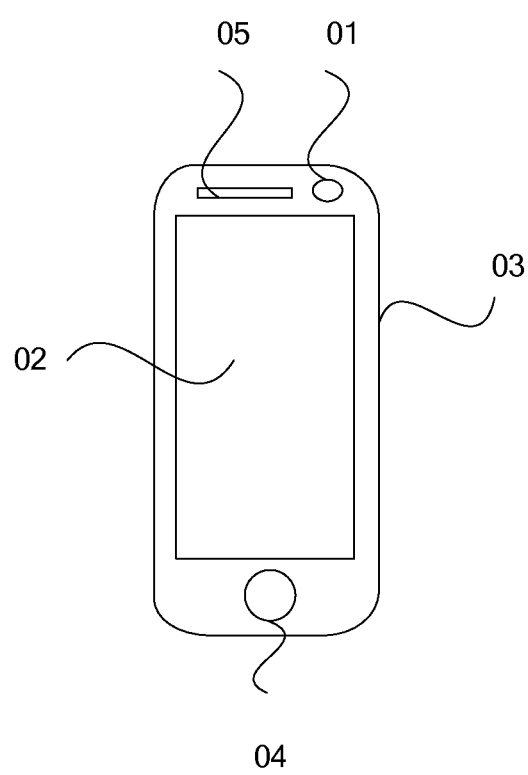
FIG. 1 is a schematic view showing the structure of a front side of a mobile phone in the existing technology.
Figure 2:
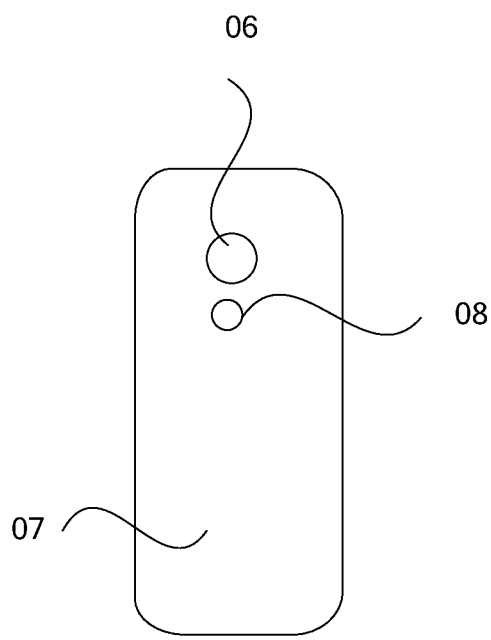
FIG. 2 is a schematic view showing the structure of a back side of the mobile phone in the existing technology.
Figure 3:
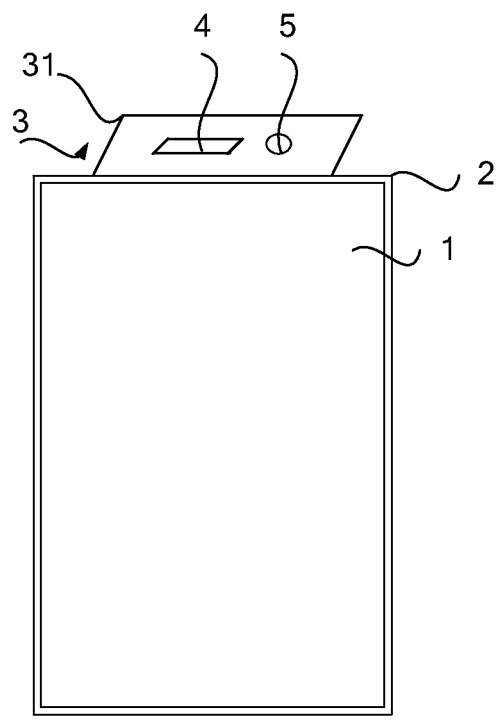
FIG. 3 is a schematic view showing a structure of a mobile communication device according to an embodiment of the present disclosure.

As shown in FIG. 3, which is a schematic view showing a structure of a mobile communication device according to an embodiment of the present disclosure. The mobile communication device according to the present disclosure comprises a display screen 1, a back cover 2, and internal communication parts (not shown in the figure) provided in a chamber defined by the display screen 1 and the back cover 2. The back cover 2 is provided with a rotating member 3 capable of rotating around an upper edge of the back cover 2, and a telephone receiver 4 and a camera 5 are provided on the rotating member 3.

The internal communication parts are necessary parts that are arranged inside the mobile communication device for obtaining the functions thereof. The internal communication parts may comprise CPU, a memory (flash, RAM), others input and output devices (functional key, USB, serial port), I/O channels, etc. These internal communication parts may be existing parts used in the mobile communication devices, which are not stated in detail herein.

The telephone receiver 4 and the camera 5 are connected with corresponding parts in the mobile communication device respectively so as to obtain corresponding telephone answering and camera shooting functions.

In the mobile communication device according to the present disclosure, the internal communication parts are installed in a chamber (not shown in the figure) defined by the display screen 1 and the back cover 2. The back cover is provided with a rotating member capable of rotating around the upper edge of the back cover. The rotating member is provided with a telephone receiver and a camera. When receiving a telephone or taking a picture by oneself, it is possible to rotate the rotating member forward at a certain angle so that the telephone receiver and the camera are situated at a suitable position on the front side of the mobile communication device. Because no telephone receiver and camera are required to be provided on the front side of the mobile communication device according to the present disclosure, it is capable of saving a front frame and positions for installing the telephone receiver and the camera on the front frame of the mobile communication device. That is to say, the mobile communication device is provided with a structure of no frame or narrow frame, and in the meanwhile, with the above-mentioned structure, there is no need to change the original way for using the mobile communication device to receive a telephone or taking pictures by oneself. And the mobile communication device is easier to use.

In a preferable embodiment, the rotating member 3 comprises a rotating plate 31, and a motor (not shown in the figures) driving the rotating plate 31 to rotate, the motor being arranged in the chamber formed by the display screen 1 and the back cover 2. The rotating plate 31 is pivoted to the back cover 2 via a pivotal shaft, and the motor is in connection with the rotating plate. Via the rotation of the motor, it is possible to control the rotating plate to rotate around the pivotal shaft.

Further, a button is arranged on the back or side surface of the back cover to control the operation of the motor. It is convenient for users to control the rotating plate to rotate.

Figure 4:
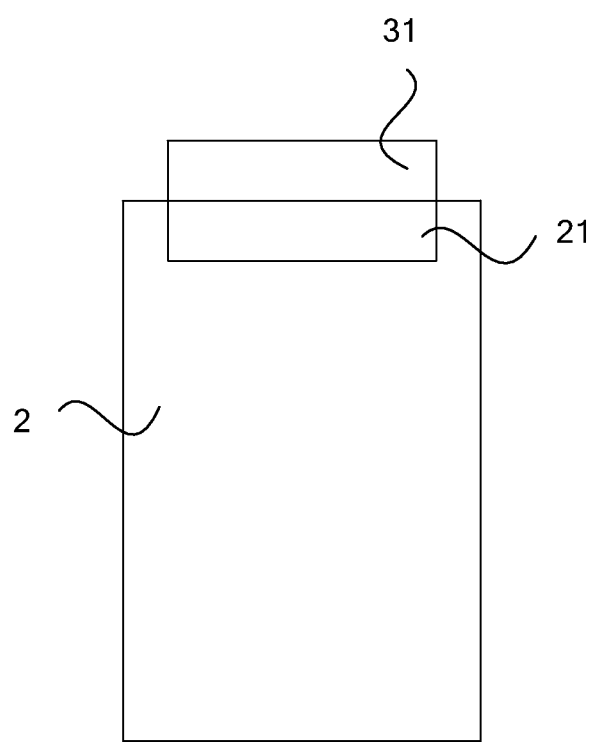
FIG. 4 is a schematic view showing another structure of a mobile communication device according to an embodiment of the present disclosure.

As shown in FIG. 4, which is a schematic view showing another structure of a mobile communication device according to an embodiment of the present disclosure. A containing groove 21 is provided on the back surface of the back cover 2 for containing the rotating plate 31. When the rotating plate 31 rotates to the back side of the back cover 2, it can be embedded into the containing groove 21. The arrangement of the containing groove 21 may reduce the thickness of the whole mobile communication device.

In a detailed embodiment, the rotating plate 31 is pivoted to the back cover 2 via a pivotal shaft. Both opposite side walls of the containing groove 21 are provided with an installation shaft (not shown in the figures), and the axial lines of two installation shafts are aligned with each other. The rotating plate 31 is provided with installation holes (not shown in the figures) corresponding to the installation shafts one by one with axial lines aligned with the axial lines of the installation shafts. Each pair of the installation shafts are installed in the installation holes in a manner such that the installation shafts are rotatably inserted into the installation holes.

In another detailed embodiment, the rotating plate 31 is pivoted to the back cover 2 via a pivotal shaft. Both two opposite side walls of the containing groove 21 are provided with an installation hole (not shown in the figures), and axial lines of two installation holes are aligned with each other. The rotating plate is provided with installation shafts corresponding to the installation holes one by one with axial lines aligned with the axial lines of the installation holes. Each pair of the installation shafts are installed in the installation holes in a manner such that the installation shafts are rotatably inserted to the installation holes.

For the convenience of the rotating plate to be rotated at a certain angle and then fixed to this position, between at least one pair of the installation shafts and the installation holes are provided with a self-locking mechanism (not shown in the figures).

To be specific, the self-locking mechanism comprises one or more convex(es) provided on a side wall of the installation shaft, and one or more concave(s) provided on a side wall of the installation hole and the convex(es) and concave(s) may be engaged with each other; or one or more concave(s) provided on a side wall of the installation shaft, and one or more convex(es) provided on a side wall of the installation hole and the convex(es) and concaves may be engaged with each other.

When the rotating plate 31 rotates at a suitable angle, it is possible to position the rotating plate 31 by the snapping the convex(es) into the concave(s).

In a preferable embodiment, the rotating angle of the rotating member around the upper edge of the back cover is in the range of 0-210 degree relative to the back cover. Preferably, for convenience of using, the rotating angle of the rotating member is generally 180 degree. At this time, the rotating member and the mobile communication device are in a straight structure with plate shape.

The mobile communication device further comprises other functional keys and an LED flash light. The functional keys and the LED flash light may be arranged on the back or side surface of back cover or on the rotating member.

More preferably, for the convenience of using, the functional keys are arranged on a side surface of the back cover.

The functional keys may be a volume key, an earphone jack, a data line terminal, a microphone, or the like. The mobile communication device may be a mobile communication device such as a mobile phone, ipad, itouch having a camera shooting function.

Obviously, a person skilled in the art can make improvements and modifications without departing from the principle of the disclosure. If all these improvements and modifications fall into the protection scope of the claims in the disclosure or the technology equivalent thereto, the present disclosure intends to contain these improvements and modifications.

What is claimed is:

1. A mobile communication device, comprising:
    a display screen,
    a back cover, and
    internal communication parts provided in a chamber defined by the display screen and the back cover,
    a rotating member is provided on an upper side of the back cover, the rotating member is rotatable around the back cover,
    a telephone receiver and a camera are arranged on a same side of the rotating member,
    wherein the rotating member comprises:
        a rotating plate provided with the telephone receiver and the camera, and
        a motor for driving the rotating plate to rotate,
        the motor is provided in the chamber defined by the display screen and the back cover, and the rotating plate is pivoted around the upper edge of the back cover via a pivotal shaft.

2. The mobile communication device according to claim 1, wherein, the telephone receiver and the camera are electrically connected with the internal communication parts.

3. The mobile communication device according to claim 1, wherein, a button controlling the operation of the motor is arranged on the back cover.

4. The mobile communication device according to claim 1, wherein, a containing groove is provided on a surface of the back cover, and the rotating plate is embeddable into the containing groove.

5. The mobile communication device according to claim 4, wherein, the rotating plate is pivoted to the back cover via the pivotal shaft, wherein,
    an installation shaft is provided on each opposite side walls of the containing groove, and axial lines of two installation shafts are aligned with each other; installation holes are provided on the rotating plate corresponding to the installation shafts, and axial lines of the installation holes are aligned with the axial lines of the installation shafts; each pair of the installation shafts are installed in the installation holes in a manner such that the installation shafts are rotatably inserted to the installation holes; or
    an installation hole is provided on both opposite side walls of the containing groove, and axial lines of two installation holes are aligned with each other; installation shafts are provided on the rotating plate corresponding to the installation holes, and axial lines of the installation shafts are aligned with the axial lines of the installation holes; each pair of the installation shafts are installed in the installation holes in a manner such that the installation shafts are rotatably inserted to the installation holes.

6. The mobile communication device according to claim 5, wherein, a self-locking mechanism is provided between at least one pair of the installation shafts and the installation holes.

7. The mobile communication device according to claim 6, wherein, the self-locking mechanism comprises:
    one or more convex part(s) provided on a side wall of the installation shaft, and one or more concave part(s) provided on a side wall of the installation hole, and the convex part(s) is engagable with the concave part(s); or
    one or more concave part(s) provided on a side wall of the installation shaft, and one or more convex part(s) provided on a side wall of the installation hole, and the convex part(s) is engagable with the concave part(s).

8. The mobile communication device according to claim 1, wherein, the angle of the rotating member rotating around the upper side of the back cover is in the range of 0-210 degree relative to the back cover.

9. The mobile communication device according to claim 1, further comprising other functional members electrically connected with the internal communication parts, and the other functional members are arranged on the back cover or on the rotating member.

10. The mobile communication device according to claim 9, wherein, the other functional member is arranged on a side of the back cover.

11. The mobile communication device according to claim 10, wherein, the other functional member is selected from at least one of a group consisting of a volume key, an earphone jack, a data line terminal, a microphone and an LED flash light.

* * * * *